United States Patent Office 3,346,240
Patented Oct. 10, 1967

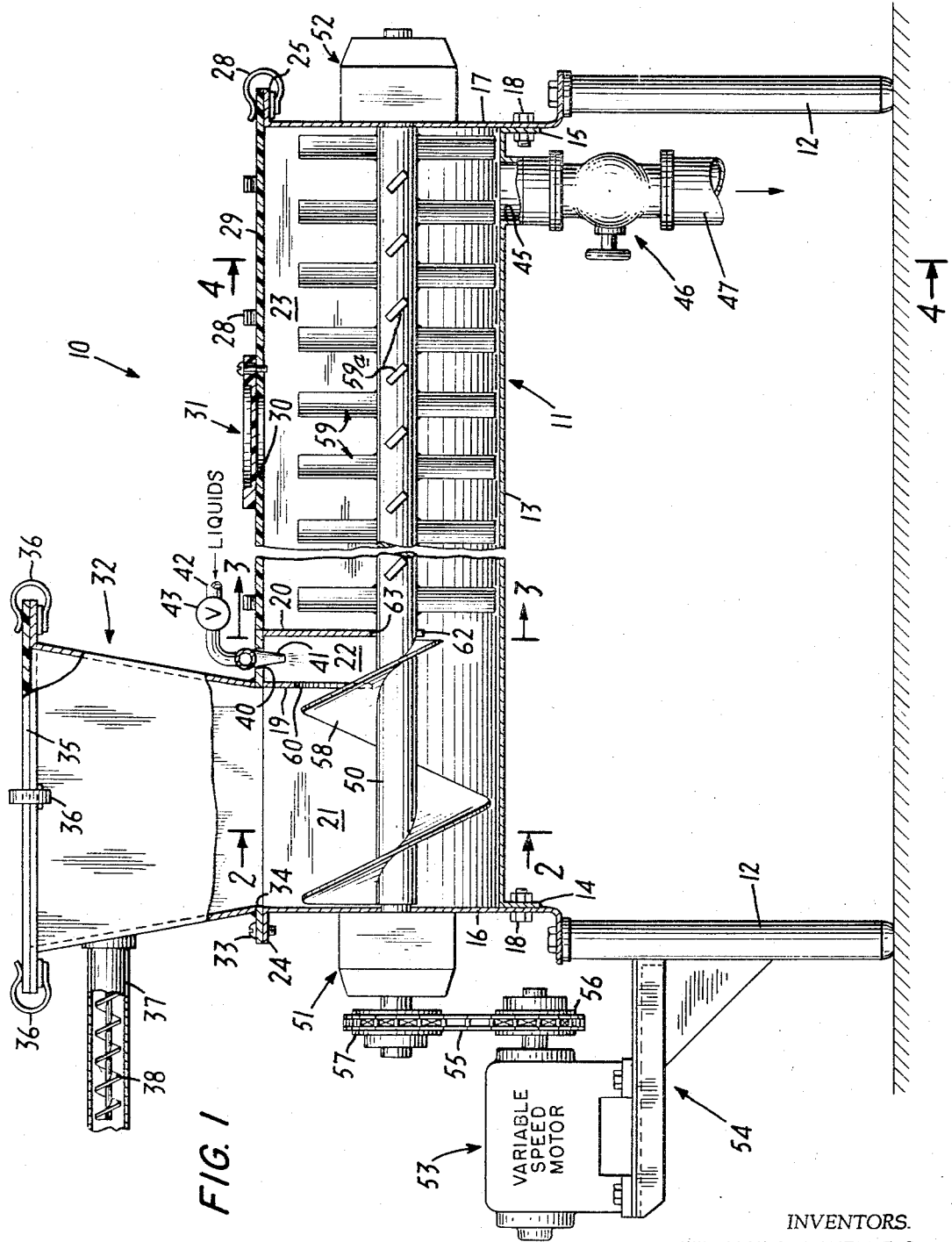

3,346,240
MIXING APPARATUS
William A. Lavelle, Flourtown, and Thomas W. Lavelle, Philadelphia, Pa., assignors to Ready T' Pour, Inc., New York, N.Y., a corporation of Delaware
Filed Jan. 15, 1965, Ser. No. 425,766
4 Claims. (Cl. 259—26)

This invention relates to mixing apparatus and, more particularly, to apparatus for continuously mixing dry powdered or granular materials and liquids.

There are many instances, such as in the pharmaceutical and food processing industries, where dry and liquid ingredients must be thoroughly and uniformly mixed to provide an end product having the desired consistency and texture. For example, in order to make pancake batter, dough or the like, various combinations and proportions of flour, shortening, sugar, salt, powdered eggs, leavening agents, pasteurized milk, water and the like must be thoroughly mixed into end products of the desired properties.

In the conventional batch mixing process, dry powdered materials are placed in a container and stirred while liquids are added in stages. The mixer must be stopped periodically to scrape off the ingredients which adhere to the surfaces of the container and the mixing elements. Where large batches are made in commercial operations, it is usually difficult and time-consuming to scrape all of the surfaces to which the ingredients adhere while the mix is still in the container, and it is also difficult to clean these surfaces between batches. Furthermore, successive batches differ in composition due to the human element involved in adding the various ingredients. Also, there may be a sanitary problem in a process which is carried out in an open container on in one which must be periodically opened for scraping, adding ingredients, etc. Attempts have been made to overcome these disadvantages of the batch process by continuous mixers, but these prior art mixers have been relatively complex, and are expensive not only to purchase but also to maintain. In addition, it is difficult and time-consuming to disassemble such mixers and clean all the interior surfaces which the ingredients contact.

Accordingly, it is an object of this invention to provide a new and improved mixing apparatus which effectively overcomes the above-mentioned disadvantages of the prior art.

Another object of the invention is to provide apparatus for continuously mixing dry powdered or granular materials with liquids in a controlled manner.

A further object of the invention is to provide a continuous mixing apparatus which is of simple design and is readily disassembled for cleaning.

Still another object of the invention is to provide a continuous mixing apparatus which is completely enclosed but the interior of which is visible from without.

These and other objects of the invention are attained by providing a first chamber having an inlet port, a second chamber having an inlet port and a mixing chamber having a discharge port. A rotatable shaft extends through all three chambers and drives conveyor means in the first and second chambers and mixing means in the mixing chamber. The shaft is preferably driven by a variable speed motor, so that the shaft may be rotated at a speed which is optimum for the particular ingredients being mixed. Baffles are disposed between the first and second chambers and between the second chamber and the mixing chamber to prevent the mix in the mixing chamber from flowing back to the second chamber and to prevent the ingredients introduced into the second chamber from flowing back to the first chamber.

All of the above is more fully explained in the detailed description of a preferred form of the invention which follows, this description being illustrated by the accompanying drawings wherein:

FIG. 1 is an elevated view, partly in section, of a typical mixing apparatus in accordance with the invention;

Figure 3:
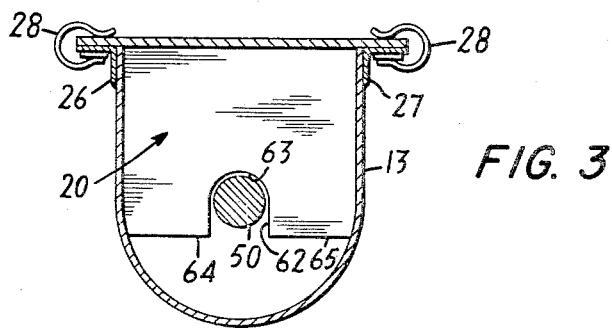
FIG. 3 is a sectional view taken along the line 3—3 of FIG. 1 and looking in the direction of the arrows.

In the representative embodiment of the invention shown by way of example in the drawings, the mixing apparatus 10 includes a housing 11 supported by four legs 12. The housing includes a trough 13 of generally U-shaped cross section, the ends of which are formed with flanges 14 and 15 to which a pair of end walls 16 and 17, respectively, are secured by a plurality of nuts and bolts 18. The trough 13 and the ends walls 16 and 17 are preferably of a durable material such as stainless steel. A pair of substantially vertical baffles 19 and 20 mounted on the trough divide the housing into three chambers: a first chamber 21 for receiving dry materials, a second chamber 22 for receiving liquids and a mixing chamber 23. The top edges of the end walls 16 and 17 are flanged outwardly at 24 and 25, respectively, and a pair of outwardly extending flanges 26 and 27 are secured to the top edges of the trough 13. Releasably secured to the flanges 25, 26 and 27 by a plurality of spring clamps 28 is a mixing chamber cover 29 provided with an inspection port 30 which may be sealed by a swing lid 31, and a hopper 32 is mounted on the flanges 24, 26 and 27 by a plurality of screws 33. The cover 29 and the swing lid 31 are preferably of a transparent material such as Plexiglas, and the hopper 32 is of a durable material such as stainless steel. The hopper is formed with a first inlet port 34 and is enclosed by a hopper cover 35 of a transparent material such as Plexiglas which is releasably secured to the hopper by a plurality of spring clamps 36.

The dry materials to be mixed are fed into the hopper through a conduit 37 by a helical feed screw 38. The rate at which the dry materials are introduced into the chamber 21 may be adjusted to the desired value by rotating the feed screw at the appropriate speed. The hopper is also provided with a plurality of second inlet ports 40 in which are disposed a plurality of nozzles 41 by means of which liquids to be mixed are sprayed into the chamber 22. The liquids are supplied to the nozzles through a conduit 42, and the rate at which the liquids are introduced to the mixer is adjusted by a valve 43.

A discharge port 45 is located in the bottom of the trough 13 at the end thereof remote from the chambers 21 and 22. The mix is fed from the discharge port 45 through a valve 46 in a conduit 47 to a suitable receptacle (not shown) or to the next process stage, depending upon the particular use of the mixer.

A single shaft 50 extending through the three chambers 21, 22 and 23 is rotatably mounted on the end walls 16 and 17 by a pair of antifriction bearings 51 and 52. A variable speed motor 53, mounted on a platform 54 secured to two of the legs 12, drives the shaft through a chain 55 and a pair of sprockets 56 and 57. A helical feed screw 58 is mounted on the shaft in the chambers 21 and 22, and a plurality of radially extending paddles 59 are mounted on the shaft in the mixing chamber 23. The faces 59a of the paddles are disposed at an angle to the longitudinal axis of the shaft of approximately 45°, so that material being mixed in the mixing chamber is simultaneously urged to the discharge port. The angle can be varied as desired, depending upon the degree of forward motion which is to be imparted to the mix, the viscosity of the mix, the number of paddles, and the like.

Figure 2:
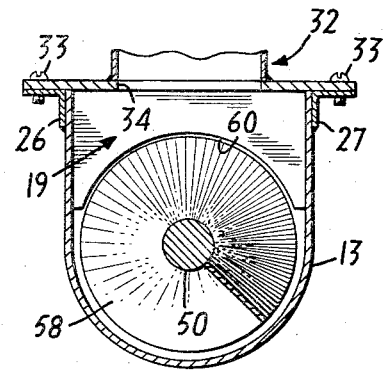
FIG. 2 is a sectional view taken along the line 2—2 of FIG. 1 and looking in the direction of the arrows.
Figure 4:
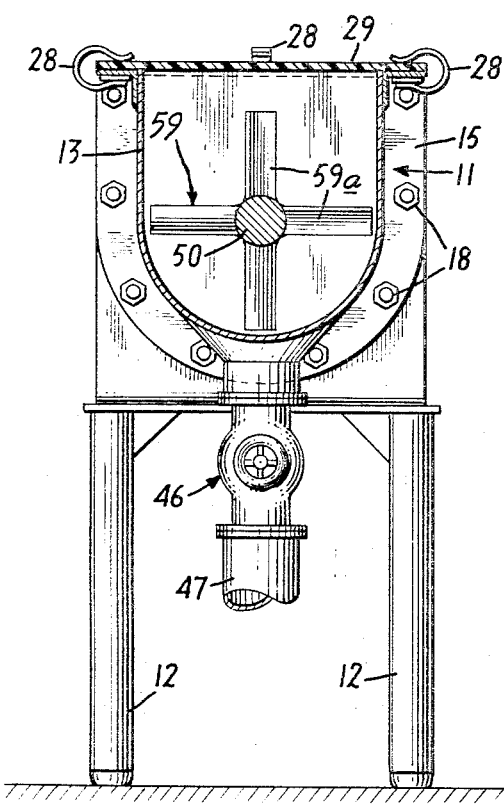
FIG. 4 is a sectional view taken along the line 4—4 of FIG. 1 and looking in the direction of the arrows.

The two baffles 19 and 20 are very important to the proper operation of the mixer. The baffle 19, best viewed in FIGS. 1 and 2, forms a barrier between the chambers 21 and 22 above the space occupied by the feed screw 58. This is so because the baffle seals the upper portion of the trough and has a lower edge including a curvilinear portion 60 which makes a close-clearance running fit with the feed screw. The feed screw in turn makes a close-clearance running fit with the semicircular portion of the U-shaped trough 13. Thus, when the shaft is driven and the feed screw forces the dry materials from the chamber 21 into the chamber 22, the liquids introduced into the chamber 22 through the nozzle 41 are prevented from flowing into the dry materials receiving chamber 21 and from wetting the surfaces of the feed screw therein. Were the feed screw so wetted in the presence of the dry materials, large lumps would be formed on the feed screw in the chamber 21 and very likely material would be backed up the hopper 32, seriously impeding, if not preventing, the operation of the mixer. In addition, the baffle 19 insures that all of the partially mixed dry materials and liquids are driven into the mixing chamber 23 rather than working back into the chamber 21.

The baffle 20, best viewed in FIGS. 1 and 3, separates the upper portions of the liquids receiving chamber 22 and the mixing chamber 23. In particular, the lower edge of this baffle includes a central, inverted U-shaped section 62 including a curvilinear portion 63 which makes a close-clearance running fit with the shaft 50 and two substantially horizontal portions 64 and 65 extending outwardly from the central portion. By this arrangement, the dry materials and the liquids are partially mixed in the chamber 22 before being driven underneath the baffle 20 into the mixing chamber 23. As a result, liquids are prevented from flowing freely into the mixing chamber and preventing the materials from being thoroughly and uniformly mixed in the desired fashion. Also, the space below the baffle 20 being considerably less than that below the baffle 19, it is evident that the materials being mixed in the chamber 23 are prevented from flowing back into the chamber 22. Furthermore, the baffle 20 causes the dry materials and the liquids to be compacted and partially mixed before being driven by the feed screw into the mixing chamber 23. The compacting of the materials produces in effect a scraping of the surfaces of the feed screw in the chamber 22 and thus prevents any formation of lumps thereon.

In operation, the feed screw 38 and the valve 43 are adjusted for the desired proportions of dry materials and liquids, and the variable speed motor 53 and the output valve 46 are set in accordance with the viscosity of the mixed materials and the desired flow rate. Dry materials introduced through the hopper 32 are driven by the feed screw 58 under the baffle 19 and into the chamber 22 where they are partially mixed with the liquids sprayed from the nozzles 41. The partially mixed materials are then driven beneath the baffle 20 and into the mixing chamber 23, where all the materials are thoroughly and uniformly mixed by the paddles 59 while being urged to the discharge port 45. The materials are thus mixed in a continuous, controlled manner while being completely enclosed, and an operator may view the interior of the apparatus during the mixing process.

While the fundamental novel features of the invention have been shown and described, it will be understood that various substitutions, changes and modifications in the form and details of the apparatus illustrated and its manner of operation may be made by those skilled in the art without departing from the spirit or scope of the invention. All such variations and modifications, therefore, are included within the intended scope of the invention as defined by the following claims.

We claim:
1. Mixing apparatus comprising means forming a first chamber, a second chamber and a mixing chamber, the second chamber being between and communicating with the first chamber and the mixing chamber, first baffle means between the first and second chambers, second baffle means between the second chamber and the mixing chamber, at least one inlet port in the first chamber, at least one inlet port in the second chamber, a discharge port in the mixing chamber, a shaft rotatable relative to and extending through the first and second chambers and the mixing chamber, conveyor means in the first and second chambers coupled to the shaft, mixing means in the mixing chamber coupled to the shaft, means for introducing only dry materials through each inlet port to the first chamber, and means for introducing liquids through each inlet port to the second chamber, the conveyor means including helical feed screw means mounted on the shaft, the mixing means including a plurality of radially extending paddles mounted on the shaft, the shaft being substantially horizontal, and the first baffle means forming a barrier to prevent any flow of dry materials and liquids between the first and second chambers above the space occupied by the shaft and the helical feed screw means, the lower edge of the first baffle means including a curvilinear portion which makes a close-clearance running fit with the helical feed screw means.

2. Mixing apparatus comprising means forming a first chamber, a second chamber and a mixing chamber, the second chamber being between and communicating with the first chamber and the mixing chamber, first baffle means between the first and second chambers, second baffle means between the second chamber and the mixing chamber, at least one inlet port in the first chamber, at least one inlet port in the second chamber, a discharge port in the mixing chamber, a shaft rotatable relative to and extending through the first and second chambers and the mixing chamber, conveyor means in the first and second chambers coupled to the shaft, mixing means in the mixing chamber coupled to the shaft, means for introducing only dry materials through each inlet port to the first chamber, and means for introducing liquids through each inlet port to the second chamber, the shaft being substantially horizontal, and the second baffle means forming a barrier to prevent any flow of dry materials and liquids between the second chamber and the mixing chamber above the shaft, the lower edge of the second baffle means including a curvilinear portion which makes a close-clearance running fit with the shaft.

3. Apparatus for mixing dry materials and liquids comprising means forming a dry materials receiving chamber, a liquids receiving chamber and a mixing chamber, the liquids receiving chamber being between and communicating with the dry materials receiving chamber and the mixing chamber, first baffle means between the dry materials and liquids receiving chambers, second baffle means between the liquids receiving and mixing chambers, means for introducing only the dry materials into the dry materials receiving chamber, means for spraying the liquids into the liquids receiving chamber, a discharge port in the mixing chamber substantially at the end thereof remote from the liquids receiving chamber, a shaft rotatable relative to and extending through the dry materials, liquids and mixing chambers, a helical feed screw mounted on the shaft in the dry materials and liquids receiving chambers, and a plurality of radially extending paddles mounted on the shaft in the mixing chamber, the faces of the paddles being at an angle to the longitudinal axis of the shaft so that any material being mixed in the mixing chamber is simultaneously urged to the discharge port, the shaft being substantially horizontal, and the first baffle means forming a barrier to prevent any flow of dry materials and liquids between the dry materials and liquids receiving chambers above the space occupied by the shaft and the helical feed screw, the lower edge of the first baffle means including a curvilinear portion which makes a close-clearance running fit with the helical feed screw.

4. Apparatus for mixing dry materials and liquids comprising means forming a dry materials receiving chamber, a liquids receiving chamber and a mixing chamber, the liquids receiving chamber being between and communicating with the dry materials receiving chamber and the mixing chamber, first baffle means between the dry materials and liquids receiving chambers, second baffle means between the liquids receiving and mixing chambers, means for introducing only the dry materials into the dry materials receiving chamber, means for spraying the liquids into the liquids receiving chamber, a discharge port in the mixing chamber substantially at the end thereof remote from the liquids receiving chamber, a shaft rotatable relative to and extending through the dry materials, liquids and mixing chambers, a helical feed screw mounted on the shaft in the dry materials and liquids receiving chambers, and a plurality of radially extending paddles mounted on the shaft in the mixing chamber, the faces of the paddles being at an angle to the longitudinal axis of the shaft so that any material being mixed in the mixing chamber is simultaneously urged to the discharge port, the shaft being substantially horizontal, and the second baffle means forming a barrier to prevent any flow of dry materials and liquids between the liquids receiving chamber and the mixing chamber above the shaft, the lower edge of the second baffle means including a curvilinear portion which makes a close-clearance running fit with the shaft.

References Cited

UNITED STATES PATENTS

| | | | |
|---|---|---|---|
| 998,048 | 7/1911 | Thomas | 259—9 |
| 1,563,101 | 11/1925 | Offenhauser | 259—10 X |
| 1,753,716 | 4/1930 | Owen | 259—168 |
| 2,628,077 | 2/1953 | Handwerk | 259—9 X |
| 2,877,524 | 3/1959 | Bishop | 259—9 X |

FOREIGN PATENTS 916,255   1/1963   Great Britain.

WALTER A. SCHEEL, *Primary Examiner.*

J. M. BELL, *Assistant Examiner.*